United States Patent [19]
Christie

[11] Patent Number: 5,881,960
[45] Date of Patent: Mar. 16, 1999

[54] METHOD AND APPARATUS FOR INCREASED MECHANICAL STABILITY OF A TAPE AND CARTRIDGE

[75] Inventor: Nicolai W. Christie, Oslo, Norway

[73] Assignee: Tandberg Data A/S/A, Oslo, Norway

[21] Appl. No.: 3,270

[22] Filed: Jan. 6, 1998

[51] Int. Cl.[6] .................................................. G11B 23/00
[52] U.S. Cl. ........................................ 242/342; 242/345
[58] Field of Search ..................................... 242/340, 342, 242/345, 345.2, 349; 360/96.3, 96.5

[56] References Cited

U.S. PATENT DOCUMENTS

| | | | |
|---|---|---|---|
| 1,081,926 | 12/1913 | Dietze | 242/345 |
| 3,236,468 | 2/1966 | Foret | 242/345 |
| 3,800,322 | 3/1974 | Schoettle et al. . | |
| 3,869,099 | 3/1975 | Inaga | 242/340 |
| 3,934,839 | 1/1976 | Serizawa | 242/345.2 |
| 4,234,140 | 11/1980 | Van Nie et al. | 242/340 |
| 4,309,002 | 1/1982 | Saitou et al. | 242/340 |
| 4,416,432 | 11/1983 | Komatsubara et al. . | |
| 4,887,775 | 12/1989 | Kanaguchi et al. | 242/342 |
| 4,896,238 | 1/1990 | Oogi et al. | 242/345.2 |
| 5,052,634 | 10/1991 | Budhwood et al. . | |
| 5,181,153 | 1/1993 | Nishimura | 242/345.2 |
| 5,505,397 | 4/1996 | Goff et al. . | |

FOREIGN PATENT DOCUMENTS

| | | | |
|---|---|---|---|
| 3-41652 | 2/1991 | Japan | 242/342 |
| 4-228161 | 8/1992 | Japan | 242/345.2 |

*Primary Examiner*—John P. Darling
*Attorney, Agent, or Firm*—Hill & Simpson

[57] ABSTRACT

A cartridge position fixing arrangement within a tape drive reduces vibration of the cartridge by fixing the vertical positioning of the tape reel axles between top mounted retaining springs pressing directly onto the cartridge above the reel axles in opposition to the tape drive motors engaging lower ends of the reel axles for rotating the axles. Each hub axle is journaled with a relatively high force at a bearing that may be formed in the upper wall of the cartridge. A reel axle locking arrangement is provided which, when the cartridge is unloaded from the tape drive, locks the position of each reel axle and centers each reel axle properly for future engagement with motor spindles of the tape drive. In one embodiment, a planar engagement between each motor spindle and each reel axle is provided.

32 Claims, 8 Drawing Sheets

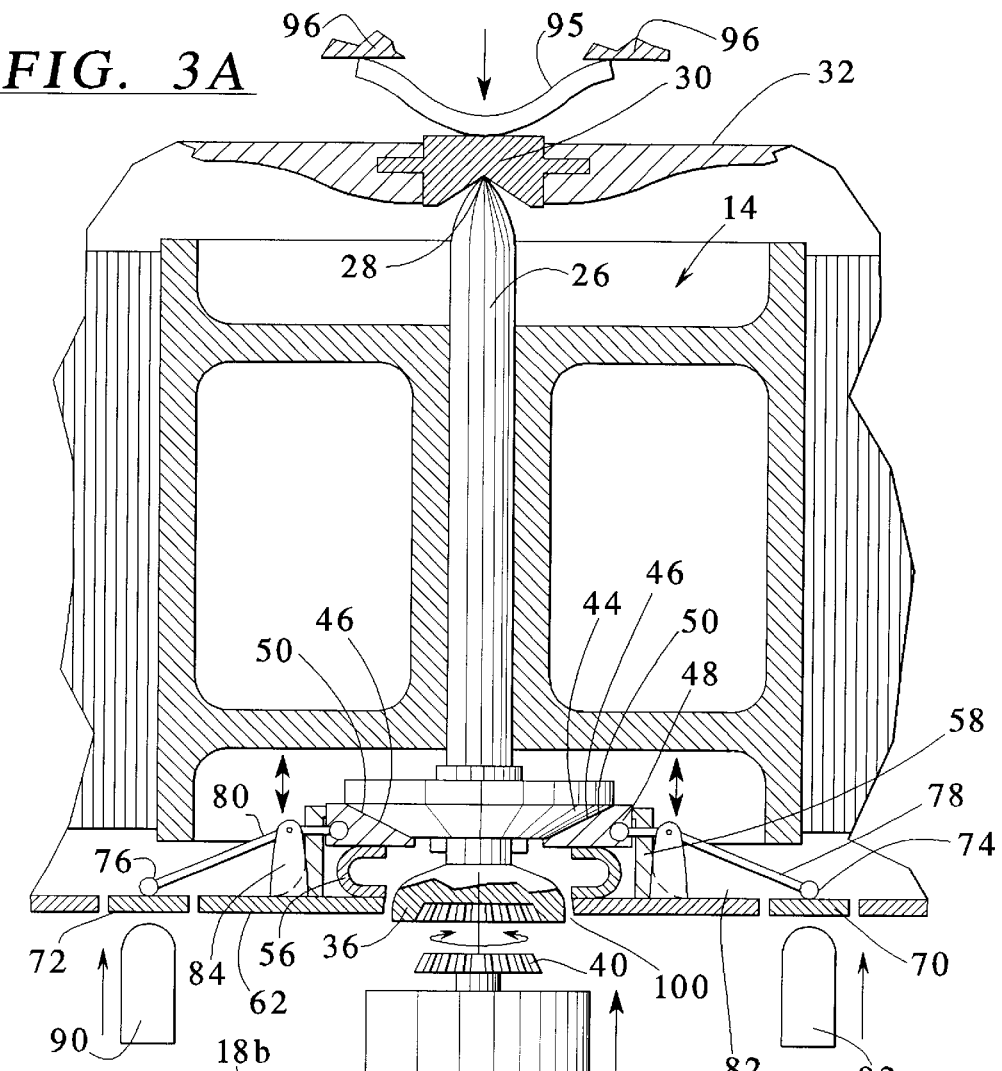
FIG. 3A
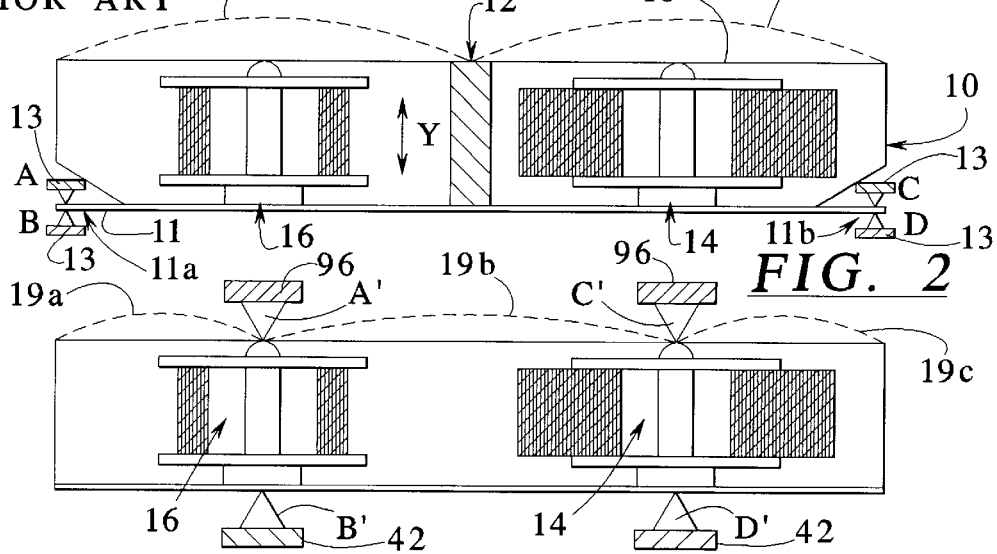
FIG. 1
PRIOR ART
FIG. 2

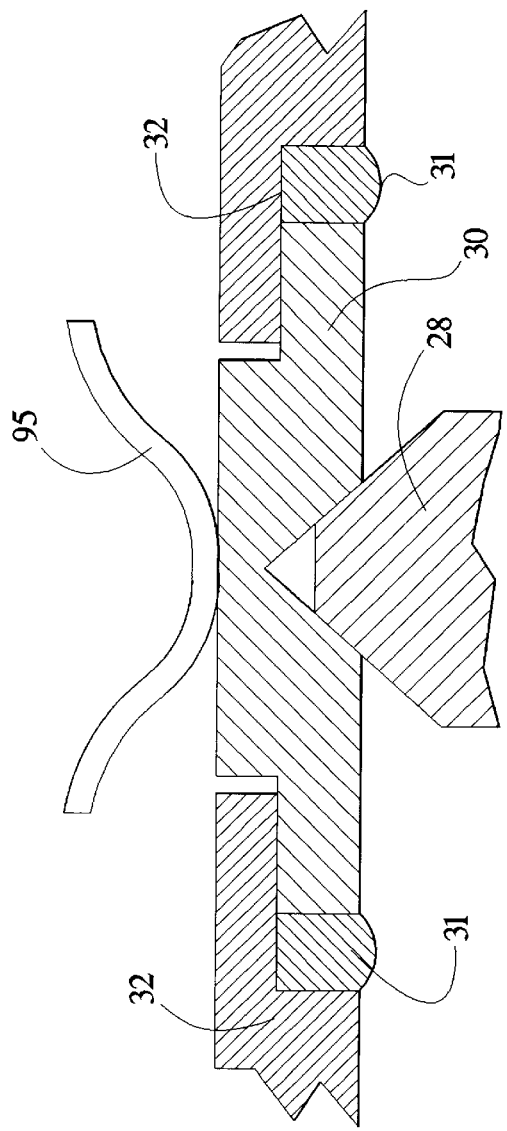
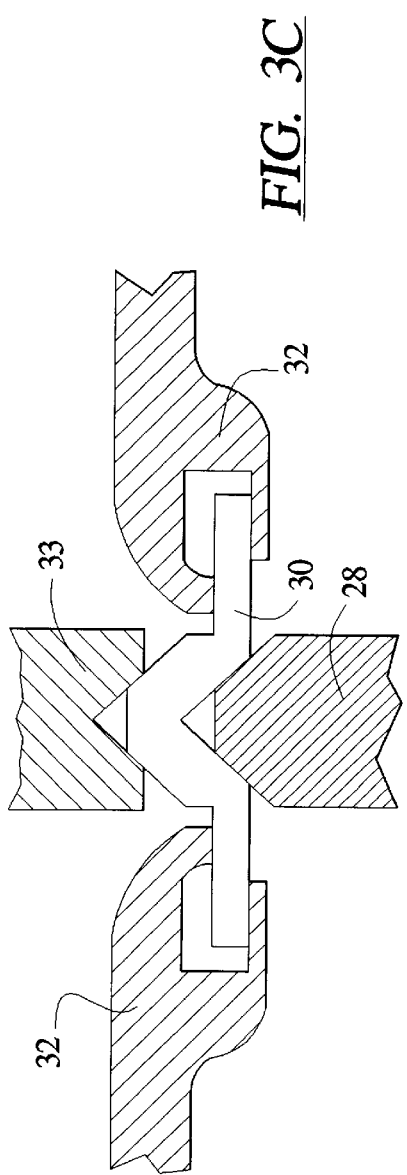
FIG. 3B
FIG. 3C

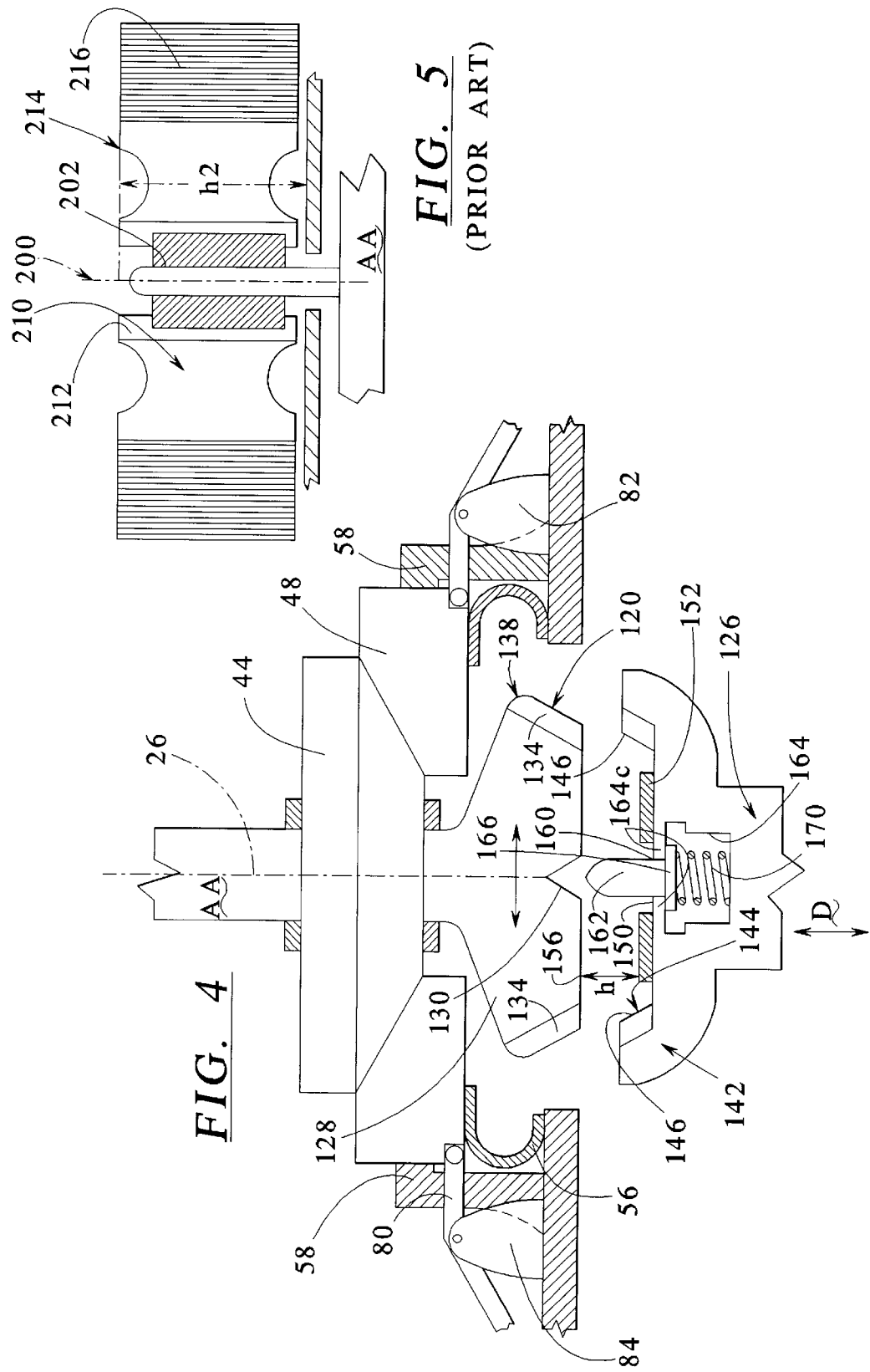

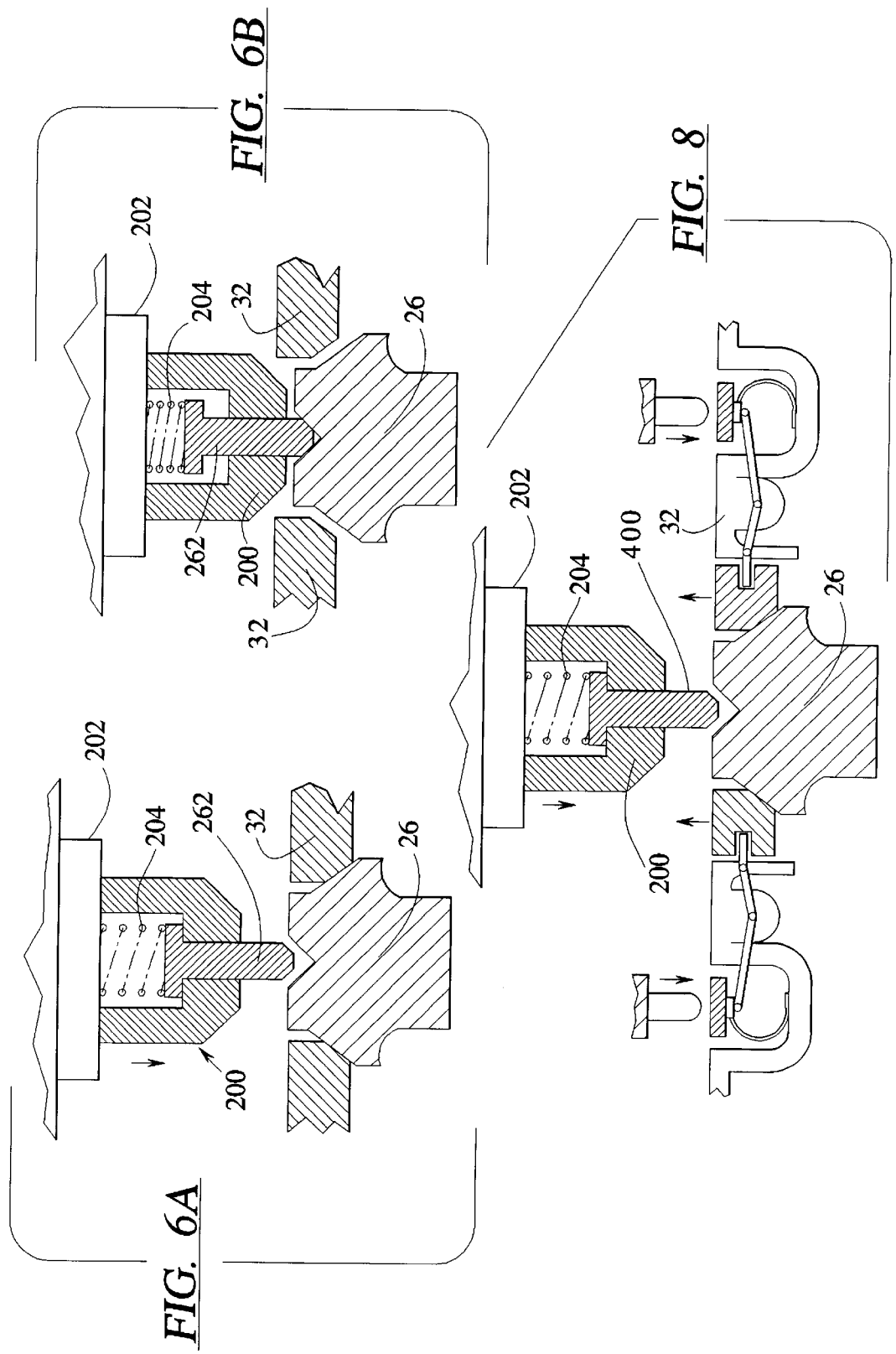

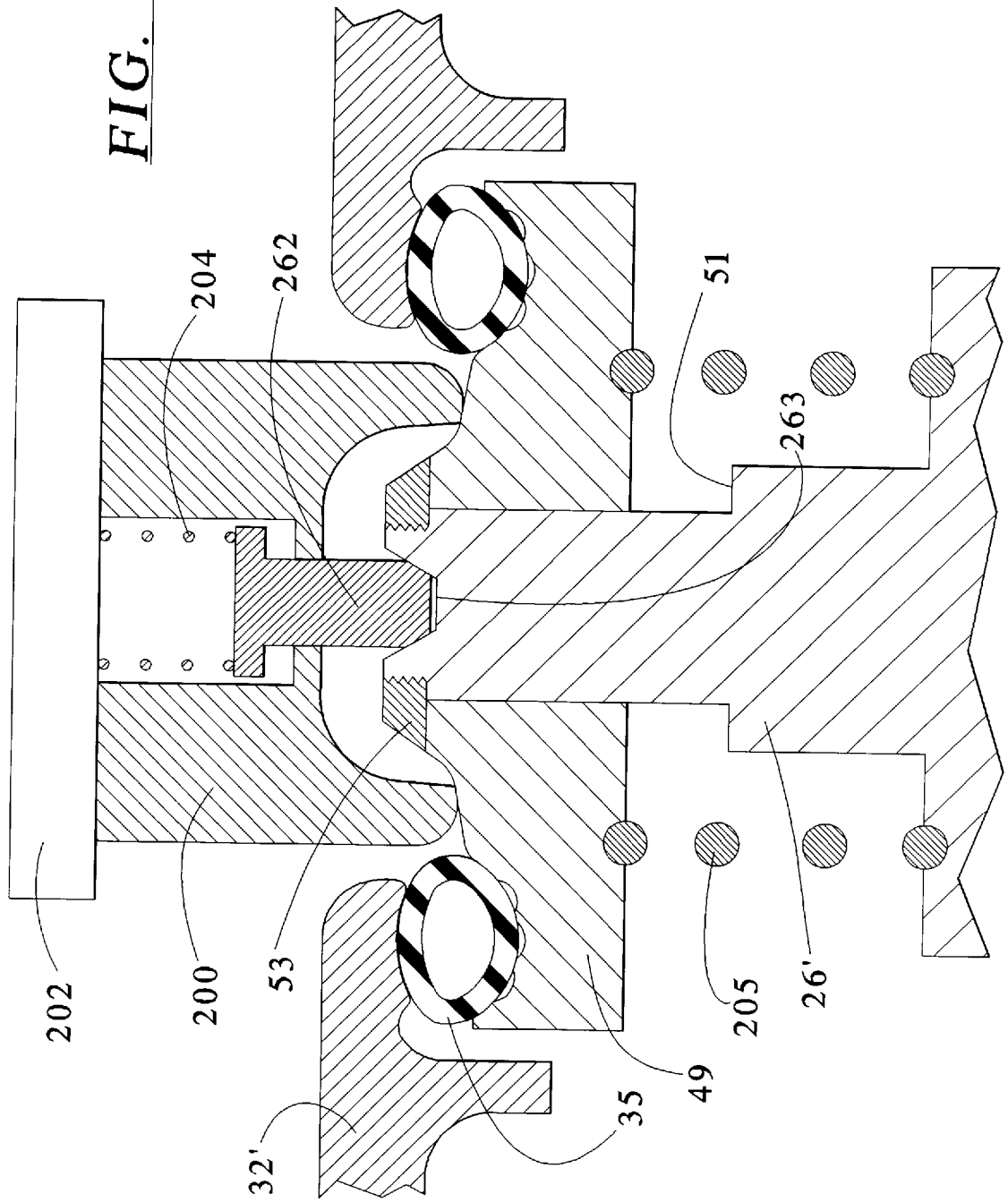

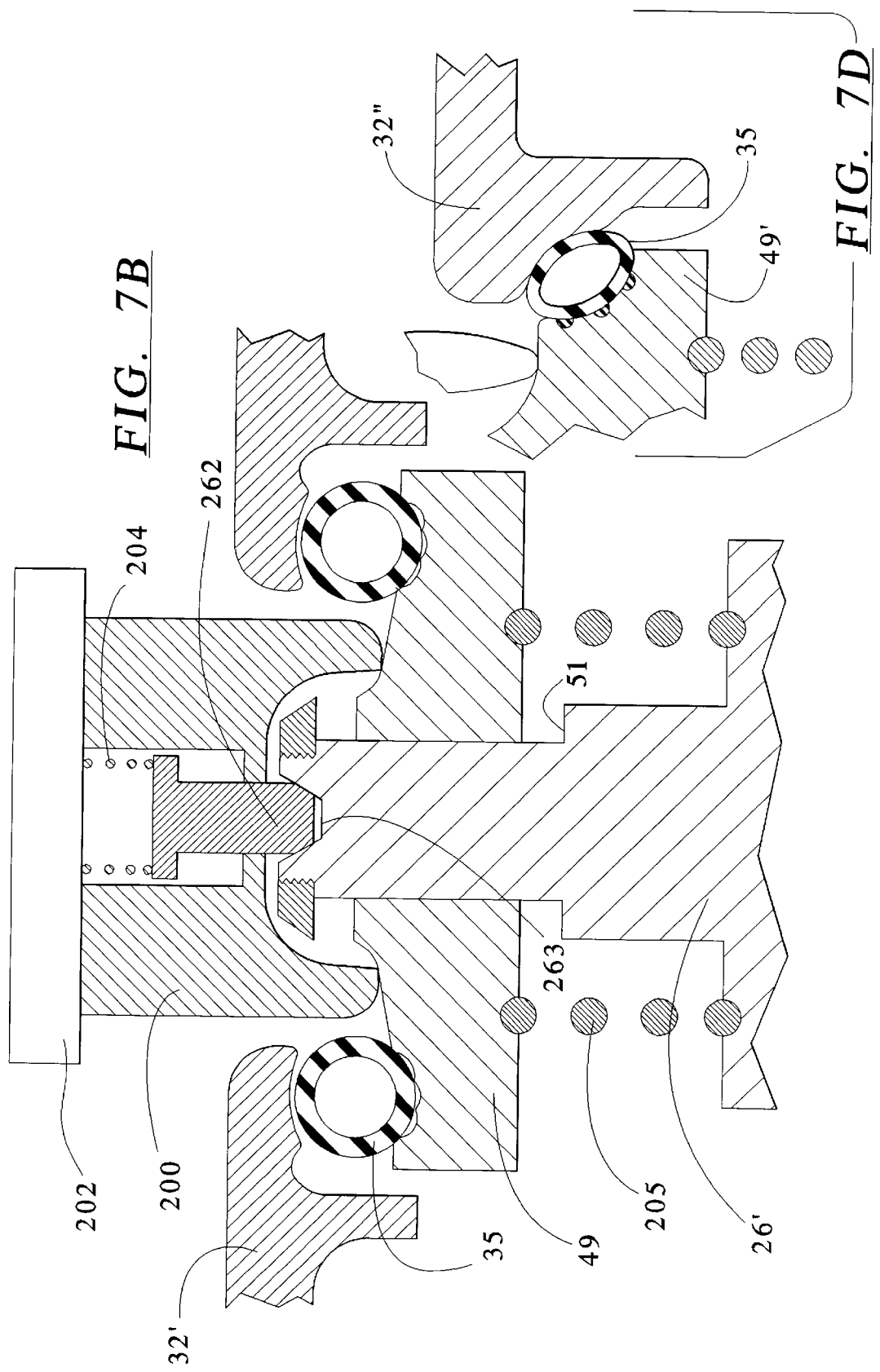

METHOD AND APPARATUS FOR INCREASED MECHANICAL STABILITY OF A TAPE AND CARTRIDGE

BACKGROUND OF THE INVENTION

The present invention generally relates to magnetic storage devices and particularly to a method and apparatus for increased mechanical stability of a tape within its cartridge when locked in an operating position and also during handling, storage and shipping.

It is of crucial importance in linear recording that the magnetic head be precisely positioned relative to the magnetic tape. This is important both during writing, when the tracks are to be positioned according to a standardized track table that defines the exact position of each track, or during reading when the head has to be positioned exactly on the track in order to avoid interference from adjacent tracks to avoid read errors. Proper positioning avoids the need for electronic error correction or time-consuming re-read operations.

In order to exactly position the tracks during a writing operation, a reference position is needed so that the tracks are positioned relative to that reference. This reference may be a fixed point inside the drive. If the position of the cartridge as well as the position of the magnetic head are precisely located with respect to this point with a given tolerance, and the tape is referenced to the cartridge, i.e., precisely located with respect to the cartridge, an unambiguous correlation can be established between the magnetic head and the tape position. The problem with this method of positioning the head and the tape is that tolerance build-up reduces the accuracy by which the magnetic storage device is able to position the tracks during a writing operation.

To solve this problem, a commonly used method is to position the tracks relative to one of the edges of the magnetic tape. To determine the position of the tape edge, the magnetic tape device may measure the amplitude from the read head, at the same time as the magnetic head is stepped across a position where the tape edge is expected to be found. The position where the tape edge is calculated, based on that measurement, is then defined as a reference point.

Using this method, various tolerances are eliminated and the position by which the tracks may be positioned onto the tape is increased considerably. However, it is noted that the success of the described method, and the precision that is obtained in positioning of the tracks that are written onto the tape, will depend on the degree the position of the tape varies relative to the cartridge and also on the degree a cartridge may be locked into a fixed position relative to the magnetic head. These two factors are of great importance to allow an increase in track density and thus the ability to meet the demands of higher storage capacity.

Variations in tape position relative to its cartridge is dependent upon various factors, such as the precision of the tape guiding mechanism and the precision of the slitting process during manufacture of the tape. Another factor of importance is the mechanical stability of the tape hubs, as vibrations in these hubs can be transferred to the tape. The components in this vibration that are perpendicular to the direction of normal movement of the tape will be transferred from the hubs to the place where the magnetic head is located, although the amplitude of this vibration may be reduced through the guiding mechanism. Since the first harmonic rotation frequency of these components may be in the order of magnitude of 50–100 Hz, it is evident that the stability of the hubs is important for the stability of the tape position.

The most direct way of controlling the tape position in this respect is to stabilize the cartridge as close as possible to the place where the hubs are located, since this is the place in the cartridge where most of the mechanical energy of movement or momentum is encountered. A method in use today for stabilization of the hubs includes use of a spring that presses the hubs down against the base cover of the cartridge. However, the spring force used is typically not very large in order to limit the friction and thus heat generation within the cartridge. It is also relatively small compared to the forces that are produced as a result of the rotational movement by the tape hubs. Furthermore, the cartridge is fixed in positions that are typically far from the center of the tape hubs. That means that the cover that holds the tape hub in place is relatively free to move and which also means that the cover does not attenuate vibrations that are produced by the tape hubs in an efficient way.

FIG. 1 shows a tape cartridge 10 having a cartridge fixing location 12 between a first tape hub 14 and a second tape hub 16. The cartridge housing 18 above the tape hubs 14,16 is fixed at the fixing location 12 to the bottom cover 11 that, in turn, is fixed to the tape drive 13 at exposed portions 11a, 11b by fixing elements A,B,C,D, (shown schematically) for holding the portions 11a, 11b fixedly to the tape drive 13. Dashed lines 18a, 18b illustrate a vibrational mode of the cartridge housing, that allows the hubs 14, 16 to move in a vertical direction (indicated with arrow Y).

FIG. 5 illustrates a prior art driver geared spline 200 having male gears 202 inserted into a geared hub 210 having female gears 212, of a tape reel 214 which holds tape 216. In order to ensure sufficient engagement, the spline must be inserted a distance h2 into the geared hub 210. It would be desirable to reduce this distance h2 so that a more compact movement can be employed to engage and disengage drive spindles from reel hubs. According to these considerations, the mechanical design of the present art does not satisfy the special requirements in the field of linear recording for a highly stable mechanical design of the tape hubs and cartridge housing, that is necessary in order to obtain reduced variation of the tape position relative to the magnetic head and thus increased track density.

SUMMARY OF THE INVENTION

It is an object of the present invention to provide a method and apparatus for increased mechanical stability of magnetic tape carried within a cartridge when locked into its final operating position, in order to achieve reduced mechanical vibration of the cartridge during operation to obtain better control of the tape position relative to the magnetic head, and thus an improved tracking performance in a magnetic storage device for linear recording of information.

It is an object of the invention to provide a device wherein the tape hubs can be locked during periods of inoperation.

It is an object of the invention to increase the stability of the tape and reduce mechanical vibrations that may be transferred to the tape located in front of the magnetic head from the tape hubs, and to enable track density and storage capacity to be increased in order to meet the market demand for cost effective magnetic storage devices with a high storage capacity.

It is furthermore an object of the present invention to provide a design of the tape hubs that enables reduced consumption of space during load and unload of a cartridge with direct drive of the hubs, as well as locking and centering of the hub position during handling, storage and shipping. Additionally, it is an object to provide an engagement between the hub and the hub driver which reduces vibration and misalignment problems.

It is an object of the invention to provide a solution to the deficiencies of the present art for locking of cartridges into fixed positions by locking the cartridge in the center of the tape hubs, for improved stability of the cartridge position relative to the tape drive.

It is an object of the invention to provide a tape hub design that provides a very tight mechanical coupling between the tape hubs and the cartridge in order to increase the stability and reduce the variation of the tape position relative to the cartridge.

It is an object of the invention to provide a hub design which provides centering and locking of the hubs when a cartridge is not loaded so that any movement or possible damage to the tape during handling, transport or storage may be avoided.

The objects of the invention are achieved by providing a tape drive having spring members arranged for pressing a cartridge from each end of the hub axle of the tape hub of the cartridge. When the cartridge is loaded into the drive, the spring is compressed and the spring force is balanced by an oppositely directed force from the opposite end of the hub axle. The objects are achieved by providing a spring above each hub axle of a two tape hub cartridge, so that a force is applied to each end of the hub axles in the same manner as previously described.

The objects of the invention are achieved by providing a tape cartridge having a hub axle with a conical point which is journaled in a concave bearing mounted in a top portion or cover of the cartridge. The tape drive spring presses directly onto a top surface of the concave bearing element. The objects of the invention are achieved by providing a shoulder ring having a tapered surface on one end of the hub axle, and a locking ring facing the shoulder ring, coaxially arranged therewith, and having a complementary tapered surface for engagement with the tapered surface of the shoulder ring. The locking ring is spring biased to frictionally engage the shoulder ring to lock the rotary movement of the tape hub. A lever arrangement is provided to release the locking ring from the shoulder ring to free the hub axle for rotation when the cartridge is engaged by the tape drive. The tapered surfaces of the locking ring and shoulder ring provide for precise axial alignment and positioning of the engagement socket of the hub axle for ease of engagement by the drive spline of the tape drive motor.

The objects are further achieved in that the spring for pressing the bearing element can also act as a heat dissipating member. The objects are achieved in that by pressing both hub axles of the cartridge during engagement by the tape drive, vibrations are reduced and a more accurate tape positioning, free from excessive vibrations is achieved.

The objects are further achieved by providing a planar engagement surface between the reel hubs and the motor spindles. An annular resilient surface on a facing side of the motor spindle presses a ring surface of each reel hub to engage each motor with each reel. Within the annular resilient surface protruding toward the hub is a spring loaded centering spindle for centering the spindle with the hub. The use of a planar surface for the transfer of force between the motor and hub allows for a small vertical space for the transfer of forces and a highly stable interface for transfer of large vertical forces. Thus, vibration is suppressed, and small angular misalignments between hub and motor spindle due to mechanical variations, are compensated.

Additional features and advantages of the present invention are described in, and will be apparent from, the detailed description of the presently preferred embodiments and from the drawings.

BRIEF DESCRIPTION OF THE DRAWINGS

FIG. 1 illustrates a transverse sectional view through a prior art tape cartridge including a schematic loading diagram.

FIG. 2 is a transverse sectional view of a cartridge of the present invention including a schematic loading diagram.

FIGS. 3A, 3B and 3C are enlarged sectional views of a tape reel and tape drive (in FIG. 3A) according to the present invention.

FIG. 4 is an enlarged partial schematic sectional view of an alternate embodiment of the tape reel and tape drive of FIGS. 3A, 3B and 3C.

FIG. 5 illustrates an enlarged partial schematic sectional view of a prior art tape reel and tape drive.

FIGS. 6A and 6B illustrate a partial schematic sectional view of an alternate embodiment of the tape reel of the present invention.

FIGS. 7A–7D illustrate partial schematic sectional views of alternate embodiments of the tape reel of the present invention.

FIG. 8 illustrates a partial schematic sectional view of an alternate embodiment of the tape reel of the present invention.

DETAILED DESCRIPTION OF THE PRESENTLY PREFERRED EMBODIMENTS

Figure 7C:
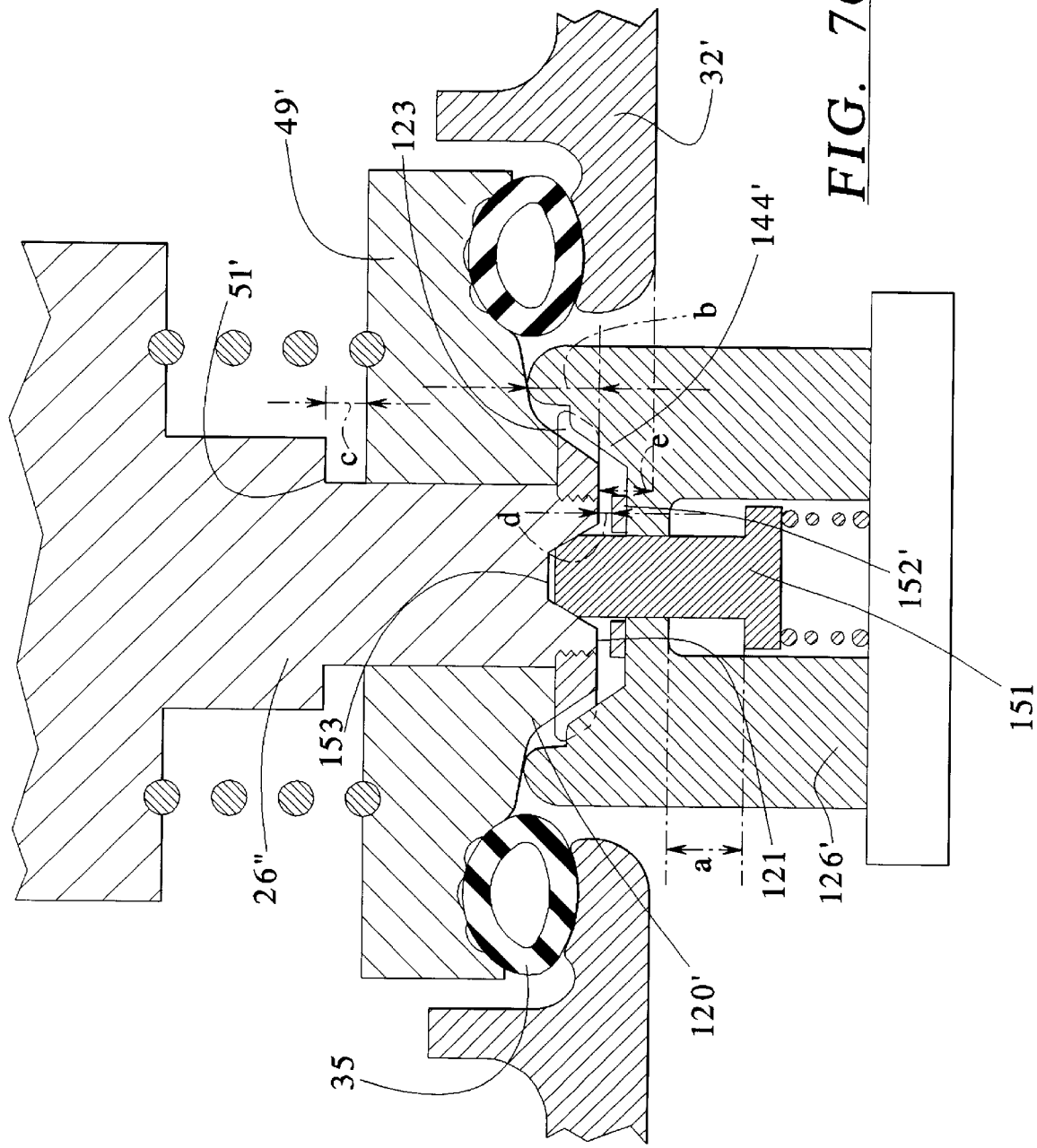

The present invention generally relates to, as compared to the prior art of FIG. 1, a method and apparatus for increased mechanical stability of a tape cartridge. FIG. 2 provides a direct vertical fixing of tape hubs 14,16 when a cartridge is installed and locked in operating position.

FIG. 2 describes the present invention cartridge position and fixing means for a tape drive wherein each of the tape hubs 14,16 is held down from above and fixed vertically from below at relative points A', B', C', D'. The vibrational mode of the cartridge is thus reduced as compared to FIG. 1 to the dashed lines 19a, 19b, 19c having reduced amplitude, particularly where stability is needed most, e.g., at the center of the hub axes. The points A' and C' are embodied in strong springs located in the tape drive as described more fully with regard to FIG. 3. Points B' and D' are also described in FIG. 3 as being the motor capstan drive members or splines.

FIG. 3A illustrates in more detail the support of the tape hub 14, for example. FIG. 3A illustrates a hub axle 26 having a relatively sharp conical top end 28 which is journaled in a bearing 30 formed into, or mounted to, a top wall (or cover) 32 of the cartridge. The axle 26 extends downwardly to a far end having the engagement socket 36 which receives the drive spline 40 of the drive motor 42 of the tape drive. Mounted on the axle 26 above the hub 36 is a shoulder ring 44 which is fixed for rotation with the axle 26. The shoulder ring 44 provides an obliquely-oriented, downwardly facing annular surface 46 which can be engaged frictionally by a locking ring 48 having a complementary inclined annular surface 50. The locking ring 48 is furthermore kept in place by a cylindrical piece 58 that is molded as a part of the bottom wall 62 of the cartridge. The locking ring 48 is spring biased against the shoulder ring 44 by an annular U-shaped leaf spring 56 which is fixed to the locking ring 48 and the bottom wall 62 of the cartridge. The leaf spring 56 may also be divided into two or more separate pieces.

The bottom wall 62 of the cartridge provides engagement buttons 70, 72 which are connected to, or pressed to, ends 74, 76 of levers 78, 80. The levers 78, 80 are pivoted on fulcrums 82, 84 and connected at their free ends to the locking ring 48. Thus, a pushing force on the engagement buttons 70, 72 forces the levers 78, 80 to pivot downward at their opposite ends to depress the locking ring 48 against the urging of the spring 56 to disengage from the shoulder ring 44.

Although two levers 78, 80 and two fulcrums 82, 84 and two pressing buttons 70,72 are described, one assembly lever, fulcrum and button can be used, or more than two can also be used.

During engagement of the cartridge in a tape drive, the drive spline 40 firmly engages into the socket 36 and the buttons 70, 72 are pressed upwardly by pushing mechanisms 90, 92 of the tape drive. The cartridge is held firmly between the top wall 32 and the bottom wall 62 by the drive spline 40, the pushing mechanisms 90,92 as well as a tape drive cartridge retaining spring 95 which is located directly above the bearing 30 and is supported from the housing 96 of the tape drive.

Thus, the hub axle 26 is strongly pinched between these points to reduce any vibration and to positively set the elevation and positioning of the cartridge and, therefore, the tape held within the cartridge. Due to the small contact area and small radius of the top end 28 of the hub axle 26, the power dissipation at the bearing 30 is minimal in spite of a relatively high spring force downwardly from the retaining spring 95. The retaining spring 95 also may act as a heat-dissipation device in order to reduce the operating temperature of the bearing and cartridge. Thus, both the bearing and the spring 95 should be composed of a highly thermally conductive material, such as a metal.

FIG. 3B shows another embodiment of the top end 28 of the spindle 26. In this embodiment, the top end 28 is conically shaped and journaled in a bearing 30 with complementary conical surfaces. The bearing 30 is a separate piece that is preferably glued to the cover 32 after positioned by a precision tool during the production process. The glue 31 is preferably of an elastic type in order to reduce mechanical tension caused by differences in thermal expansion coefficient of the bearing 30 and the top cover 32.

FIG. 3C shows another embodiment of the present invention wherein the non-rotating bearing 30 is centered by a drive hub 33 that is conically shaped in which a conically formed top of the bearing 30 becomes journaled when the cartridge is loaded into the tape drive.

When the cartridge is unloaded from the drive, the above-described design allows the engagement buttons 70, 72 to descend under influence of the spring 56 through the levers 78, 80, and the locking ring 48 engages with the shoulder ring 44. The tapered surfaces 46, 50 mate to self align the socket 36 to a very precise position for future engagement by the spline 40 of the drive motor 42. The self-centering of the engagement socket helps to ease loading the cartridge into driving engagement and alignment of the socket 36 with the axis of the spline 40. Also, the locking ring 48 provides a locking of the hub position when a cartridge is not loaded, and avoids any movement or possible damage to the tape during handling, storage and shipping. A small space 100 is provided around the socket 36 to accommodate a fine intolerance in the mounting or positioning of the motor within the tape drive relative to the cartridge. It is also to be observed that only a small relative movement between the cartridge and the motor axis is needed for engagement of the motor axis of the magnetic storage device with the tape hubs of the cartridge. This reduces the consumption of space that is needed for loading and unloading the cartridge and enables a very compact drive design.

FIG. 4 illustrates an alternate arrangement of the present invention. Particularly, FIG. 4 illustrates an alternate hub 120 which is driven by an alternate drive spindle 126. Parts which are substantially identical to parts shown and described in FIGS. 3A, 3B and 3C are given the same identifier numbers.

The alternate hub 120 includes a substantially solid hub, including a circular hub plate 128 having a concavity 130 on an exposed surface thereof, e.g. the bottom surface shown in FIG. 4. The hub 120 includes tapered gear teeth 134 around an outside circumference thereof, forming a male gear spline 138. The drive spindle 126 which is driven by a motor (not shown) includes a drive hub 142 having a female gear hub 144 formed by a plurality of gear teeth 146.

The drive hub 142 includes an annular flat surface 150 recessed from a distal end of the female gear hub 144. On the flat surface 150 is arranged an annular plate 152 composed of resilient material, such as a flexible rubber.

The hub plate 128 includes an annular planar surface 156 surrounding the concavity 130 and facing the annular plate 152. At a center of the annular flat surface 150 is an aperture 160. A centering spindle 162 extends from a cavity 164, through the aperture 160, and extends upwardly therefrom. The centering spindle 162 is substantially bullet shaped or conical and includes a base flange 166 within the cavity 164 which prevents the removal of the centering spindle 162 from the cavity 164. The base flange 166 is urged toward the hub plate 128 by a spring 170 held within the cavity 164.

When the drive spindle 126 and the hub plate 128 are moved together in the direction D, and after the buttons 70,72 have been pressed in so that the shoulder ring 44 and the spindle 26 are released, the centering spindle 162 causes the reel axle 26 to align axially with the drive spindle 126 by force of the centering spindle 162 on the inside surface of the concavity 130. Against the urging of the spring 170, the centering spindle 162 is driven into the cavity 164 as the hub plate 128 and drive hub 142 are engaged together. The surface 156 engages the annular plate 152. The gear teeth 134 loosely circumferentially mesh with the gear teeth 146.

After the levers 78,80 release the locking ring 48 from the shoulder ring 44 as described above, the drive spindle 126 can then be rotated to forcibly rotate the hub plate 128 and the hub axle 26 by transferring a radial force between the annular flat surface 150 to the planar surface 156 by way of the annular plate 152 and friction force. The gear teeth are provided as back up in the event the annular plate 152 allows slippage due to wear or insufficient friction.

The annular plate 152 allows a surface engagement, using radial force. The engagement height h needed is significantly less than the engagement height h2 shown in FIG. 5 wherein the geared spline 200 having the male gears 202 is inserted into the geared hub 210 having the female gears 212.

In FIG. 5, the distribution of force between the male gears 202 and the female gears 212 is vertically spread along the axis AA. On the other hand according to the invention of FIG. 4, the distribution of turning force across an interface is radially arranged between the flat surface 150 and the planar surface 156 in a plane. The advantage of such a planar, radial interface is that the necessary space in a vertical direction h for transfer of turning force from the driver spindle and to the hub axle is smaller than h2 and a highly stable interface is also created for transfer of large axial forces. This suppresses vibrations and also compensates for small angular offsets between an axis of the drive spindle and an axis of the hub axle. The planar interface is thus a compact arrangement for combined transfer of both vertical and rotational forces from the driver, such as a motor, to the cartridge.

The centering spindle 162 is beneficial to the planar interface drive of the invention because if the axes of the drive spindle 126 and the hub axle 26 were not accurately aligned, a problem of heat generation, vibrations and large horizontal forces may occur. The problem is avoided by using the spring loaded centering spindle 162 to precisely align axes of the reel axle 26 and the drive spindle 126 during engagement between the hub plate 128 and the drive hub 142. The centering spindle 162 can be installed into the cavity 164 and overlying portions 164a can be bent over to capture the centering spindle 162 therein.

The female hub 144 and the male gear spline 138 mesh loosely during engagement of the hub plate 128 and the drive hub 142. The gear teeth 134, 146 serve as additional protection against slippage and mechanical failure of the cartridge or drive. Alternately, the planar interface provided between the flat plate 150 and the planar surface 156 may be deleted, and the gears 134, 146 provided by the female hub 144 and the male gear spline 138 may be the engagement interface between the alternate hub 126 and the hub plate 128. The latter arrangement may still provide improved compactness and adequate performance as well.

Although FIGS. 3A, 3B and 3C and FIG. 4 illustrate constructions of one tape hub 14 and associated equipment, both tape hubs 14,16 of the two reel cartridge can be, and preferably are, provided with identical features.

FIGS. 6A, 6B, 7A–7D, 8 and 9 illustrate alternate embodiments of the present invention where, again, like numerals refer to like parts. FIGS. 6A and 6B, in particular, illustrate a preferred embodiment of the top bearing 30. In this embodiment, the top bearing 30 has been moved from within the cartridge to outside the cartridge as clearly designated by the location of the top wall 32 of the cartridge. A centering spindle 262 is fixed for rotation relative to a centering element 200. That is, the centering spindle 262 and the centering element 200 rotate together with the axle 26 and are supported by a bearing 202 on a side that includes a tape drive. A spring 204 defines a force that is applied to the axle 26 between the bearing 202 and an axis of a motor. During storage, the axle 26 is locked between the top cover 32 and a locking ring 48. During operation, the axle 26 is released from the top cover 32 by lowering the same a small amount relative to the top cover 32 to avoid any friction between the axle 26 and the top cover 32 and to allow for precise centering. This particular operational detail is generally illustrated in FIG. 6B.

The advantage of this particular embodiment of the present invention is a reduced cost of the components of the cartridge and the reduced friction and heat generation caused during operation of the system. A variation of this embodiment eliminates the bearing 202 and allows the centering element 200 to be fixed to rotate relative to the drive. The axle 26, therefore, acts as a bearing for the fixed centering spindle 262.

Referring now to FIGS. 7A and 7B, another embodiment of the present invention is illustrated. Like the embodiment illustrated in FIGS. 6A and 6B, the embodiments shown in FIGS. 7A and 7B include a centering spindle 262 and a centering element 200 that rotate together with an axle 26' and are supported by a bearing 202 on a side that includes a tape drive. In this embodiment, the centering element 200 is modified to press onto a resiliently biased locking ring 49. A spring 204 acts in combination with the spring 205 and defines the force applied to the axle 26' between the bearing 202 and an axis of a motor when the cartridge is loaded into the tape drive. During storage, the axle 26' is locked between a top cover 32' and the locking ring 49.

When loading of the cartridge initiates, the centering piece 200 is moved towards the axle 26' and the centering pin 262 first enters a centering opening 263 on top of the axle 26'. FIG. 7A illustrates the centering pin 262 engaged completely with the axle 26' when the centering element 200 has reached a position such that it barely touches the locking ring 49. When the centering piece 200 advances further in the same direction as the axle 26', the centering piece 200 pushes the locking ring 49 further down. In this way, the axle 26' is released from the cartridge cover 32' until it reaches the operation position shown in FIG. 7B. The extreme positions of the locking ring 49 is determined by a shoulder 51 of the axle 26' and a stop element 53 mounted on top of the axle 26'.

Like the embodiment illustrated in FIGS. 6A and 6B, the embodiments illustrated in FIGS. 7A and 7B provide for reduced friction and heat generation. Further, efficient dust protection is provided by means of a circular sealing ring 35. Further, no movement of the axle 26' relative to the cartridge cover 32' occurs during loading or unloading of the cartridge. An edge of the cartridge cover 32' defines a maximum tolerance and provides for centering of the axle 26'. The precision part of the centering is, therefore, provided by the centering pin 262. A further advantage is that a flexible coupling between the cover 32' and the axle 26' is obtained that may protect the cartridge against "tape pack shift." Tape pack shift may occur during shock, or when the cartridge is exposed to very high forces, such as, for example, during a free fall onto the floor. Such a tape pack shift is characterized by the part of the tape pack that slides towards the cover in one or another direction due to the fact that the frictional forces inside the tape pack are not large enough to withstand the large forces that act on the tape pack or hub during the impact. The resilient sealing ring 35 reduces the maximum force that acts on the tape pack, and thus reduces the risk of tape pack shift.

Referring now to FIG. 7C, a similar embodiment is illustrated as shown with reference to FIGS. 7A and 7B, but is implemented as an alternative for the interface between a drive spindle and centering element 126' and a cartridge spindle 26". In the embodiment illustrated in FIG. 7C, a bottom surface 121 of the cartirdge spindle 26" is oriented towards the drive spindle and centering element 126' and is expanded compared to that shown in FIGS. 7A and 7B to provide additional room for an annular ring 152'. Furthermore, the stop element 123 works as both a stop element and a male gear spline that is engaged by a female gear hub 144' of the drive spindle 126' when the cartridge is loaded into the drive. As a result of the assembly illustrated in FIG. 7C, reduced cost is provided due to fewer parts and correspondingly less cost to assemble the same. To assure that the centering spindle 151 enters the centering hole 153 of the cartridge spindle 26" before the female gear hub 144' of the drive spindle 126' engages into the male gear spline and stop element 123, the measure "a" in FIG. 7C is shown to be approximately equal to "b".

To assure that the drive spindle 126' engages completely with the cartridge spindle 26" before the locking ring 120' meets the indicated shoulder 51' of the cartridge spindle 26", the distance "c" is shown to be greater than "d".

Furthermore, to assure that the end of the cartridge spindle 26" never protrudes outside the surface of the cover 32' of the cartridge during shock or strong vibration, the distance "e" is approximately equal to two times "c". Still further, the distance "d" is large enough to allow the sealing ring 35 of the locking ring 49' to disengage completely from the cartridge cover 32' before loading is finished.

FIG. 7D illustrates an alternate embodiment of the locking ring 49' as it meets an edge of a top or bottom cover 32' of the cartridge. As shown, the circular sealing ring 35 is compressed at an angle between the cartridge cover 32" and the locking rings 49'.

The above embodiments described and illustrated with respect to FIGS. 7A–7D provide improved mechanical robustness of the cartridge and reduce the risk of tape pack shift by means of a flexible coupling between the hub axle and the cartridge cover. In addition, dust protection is provided by use of the flexible sealing rings that also lock the hubs in a fixed position during storage and shipping.

Another embodiment of the present invention is generally illustrated with reference to FIG. 8 wherein the centering spindle 400 is locked in a similar manner to that previously described. However, in the embodiment illustrated in FIG. 8, no need exists to lower the axis 26 relative to the top cover 32 of the cartridge as required in the embodiments described with reference to FIGS. 6A, 6B and 7.

Figure 9:
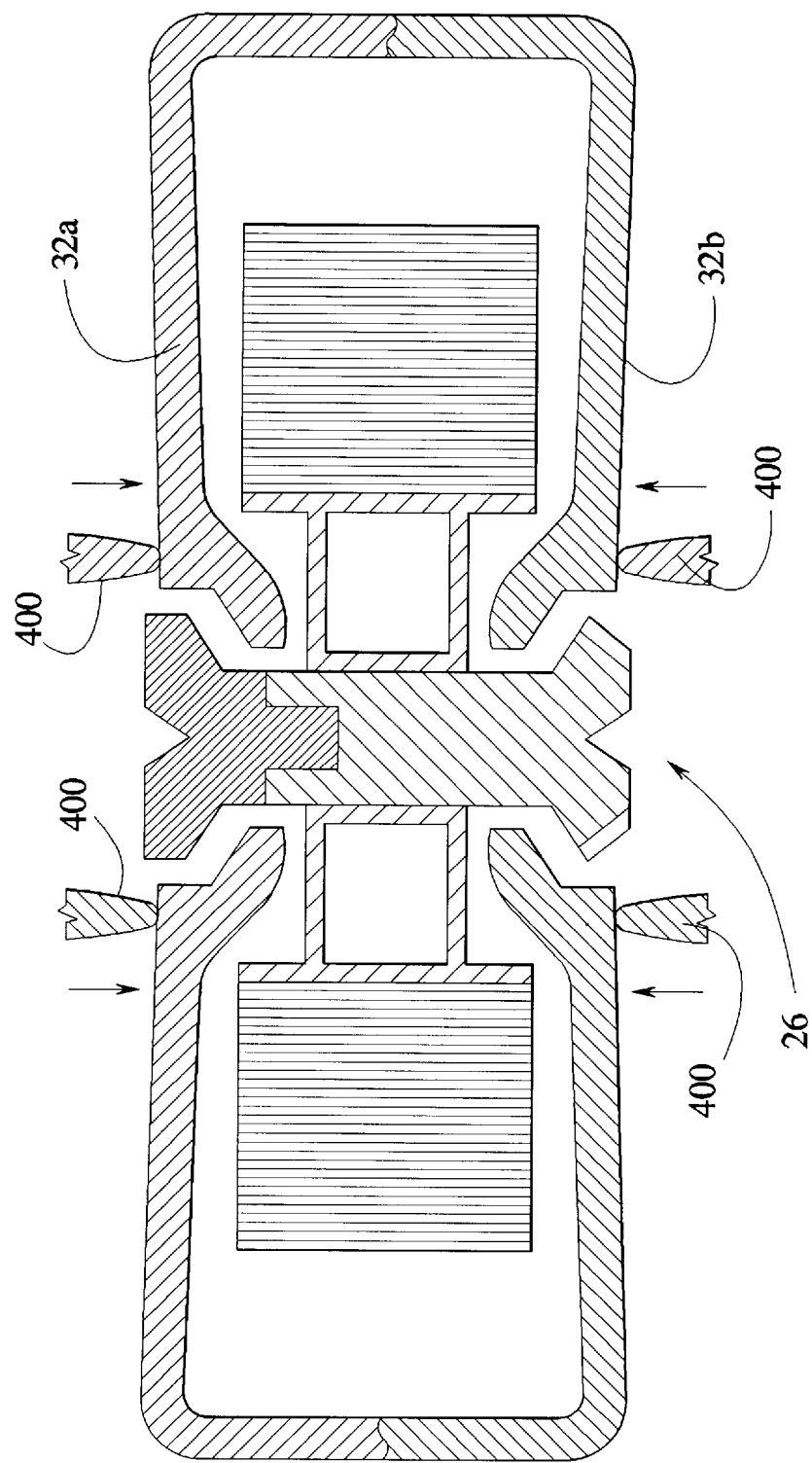
FIG. 9 illustrates a partial schematic sectional view of an alternate embodiment of the tape reel of the present invention.

With reference to FIG. 9, another embodiment of the present invention is generally illustrated wherein the axis 26 holds together the cover 32 when the cartridge is unloaded. This particular embodiment results in a low cost solution. During loading, pressed elements 400 of the drive push towards the top and bottom cover 32a, 32b to relieve the axis 26 for centering and to avoid friction. For assembly of the cartridge, the axis 26 requires that the two pieces are joined together after the covers 32a, 32b have been assembled together.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A tape drive and cartridge assembly for positioning precisely a cartridge having at least one tape hub rotatable on a hub axle within a tape drive housing, the assembly comprising:
   a cartridge having a hub axle having tape coiled therearound;
   a tape drive for rotationally driving said hub axle;
   a first retaining spring arranged above one end of the hub axle and exterior to the cartridge; and
   a tape drive spline arranged exterior to the cartridge and provided facing an opposite end of said hub axle wherein the first retaining spring and said tape drive spline resiliently clasp said hub axle therebetween.

2. the assembly according to claim 1 further comprising:
   a second retaining spring arranged above a second hub axle of said cartridge and a second tape drive spline, said second retaining spring and said second tape drive spline clasping said second hub axle of said cartridge therebetween.

3. The assembly according to claim 2 wherein both said first and second retaining springs are composed of a thermally conductive material.

4. The assembly according to claim 1 wherein said first retaining spring is composed of a thermally conductive material.

5. The assembly according to claim 1 wherein said first retaining spring comprises a leaf spring.

6. A tape cartridge for use with a tape drive having a drive spline comprising:
   at least one tape hub for holding spooled tape, said tape hub including a hub axle having a pointed shape at one end and a socket at a respective other end, said socket engageable by the drive spline of the tape drive for turning said hub axle; and
   a cartridge housing having a first wall and a second wall respectively adjacent opposite ends of said hub axle, said first wall holding a bearing element over said pointed end of said hub axle, said bearing element having a concave surface receiving said pointed end of said hub axle and having a surface exposed outside of said first wall. and said second wall having an aperture therethrough exposing said socket to said drive spline.

7. The cartridge according to claim 6 further comprising:
   a shoulder ring fixed to said hub axle and having a first tapered surface facing said second wall;
   a locking ring between said shoulder ring and said second wall and having a complementary second tapered surface facing said first tapered surface of said shoulder ring;
   a spring means for biasing said second tapered surface of said locking ring to contact with said first tapered surface of said shoulder ring; and
   an actuation means for overcoming said spring means to release said locking ring from engagement with said shoulder ring.

8. The cartridge according to claim 7 further comprising:
   at least one lever connected to said locking ring at one end thereof, and a fulcrum extending from said second wall and connected to a midpoint of said lever; and
   a pressable portion exposed on said second wall and connected to an opposite end of said lever wherein pressing of said pressable portion pivots said lever about said fulcrum to move said locking ring away from said shoulder ring.

9. The cartridge according to claim 6 further comprising:
   locking means for locking the rotary, as well as translational, movement of said hub axle when said cartridge is disengaged from said tape drive, and for releasing rotary, as well as translational, movement of said hub axle when said cartridge is engaged by said tape drive.

10. The cartridge according to claim 9 wherein said locking means is arranged between said hub and said spool and further provides the function of centering said hub within said aperture in said second wall.

11. A tape cartridge comprising:
    at least one tape hub including a rotatable hub axle having a tape drive engagement end;
    a cartridge housing having a first wall and a second wall respectively adjacent opposite ends of said hub axle, said housing substantially enclosing said tape hub, said second wall having an aperture therethrough exposing said tape drive engagement end to outside said cartridge housing; and
    a hub axle brake arranged within said housing and engaged with said hub axle when said cartridge is not engaged by a tape drive.

12. The cartridge according to claim 11 further comprising:
    a shoulder ring formed on said hub axle and a locking ring fixed for nonrotation to said second wall; and
    a spring biasing said locking ring frictionally against said shoulder ring.

13. The cartridge according to claim 12 further comprising:
   a tapered surface facing said second wall wherein said locking ring is arranged between said tapered surface and said second wall, said locking ring having a complementary tapered surface frictionally engaged with said tapered surface of said shoulder ring.

14. The cartridge according to claim 13 further comprising:
   a lever connected to said locking ring at one end, pivotally connected to said second wall at a middle thereof, and connected to a pressable portion of said second wall at an opposite end thereof, said pressable portion moveable by said tape drive to disengage said locking ring from said shoulder ring.

15. The cartridge according to claim 14 further comprising:
   a socket for receiving a drive spline of a tape reel motor of a tape drive.

16. A tape drive and cartridge assembly comprising:
   a cartridge having a housing with a first wall and a second wall, and further having a hub axle within said housing between said first wall and said second wall having a tape coiled therearound, and a hub at a base end thereof having a planar surface exposed outside said housing through said second wall;
   a tape drive having a drive housing for receiving said cartridge; and
   a motor driven tape drive spindle located exterior to the housing of the cartridge and having a flat surface at a distal end thereof, said flat surface frictionally engaging said planar surface to rotationally drive said hub axle.

17. The tape drive and cartridge assembly according to claim 18 further comprising:
   a resilient plate interposed between said flat surface and said planar surface and secured to one of said flat surface and said planar surface.

18. The tape drive and cartridge assembly according to claim 16 further comprising:
   a plurality of first gear teeth surrounding said flat surface of said drive spindle; and
   a plurality of second gear teeth surrounding said planar surface of said hub wherein said plurality of first and second gear teeth mesh together when said flat surface engages said planar surface.

19. The tape drive and cartridge assembly according to claim 16 further comprising:
   a concavity surrounded by said planar surface wherein said drive spindle includes a pointed centering spindle extending from a central region of said flat surface toward said concavity to be received therein during engagement of said flat surface to said planar surface.

20. The tape drive and cartridge assembly according to claim 16 further comprising:
   an annular resilient plate, and said planar surface and said flat surface have annular shapes, said annular resilient plate attached to said flat surface; and
   a means for centering said planar surface with said flat surface during engagement between said resilient plate and said planar surface.

21. The tape drive and cartridge assembly according to claim 20 wherein said tape drive housing includes a retaining spring located directly above said hub axle of said cartridge for resiliently clamping said hub axle between said retaining spring and said resilient plate.

22. The tape drive and cartridge assembly according to claim 21 wherein said cartridge housing includes a bearing element carried by said first wall and contacting said retaining spring, said bearing element having a bearing concavity on a side facing said hub axle including a pointed end journaled in said bearing concavity.

23. The tape drive and cartridge assembly according to claim 16 further comprising:
   a shoulder ring fixed to said hub axle and having a first tapered surface facing said second wall;
   a locking ring between said shoulder ring and said second wall and having a complementary second tapered surface facing said first tapered surface of said shoulder ring;
   a spring means for biasing said second tapered surface of said locking ring to contact with said first tapered surface of said shoulder ring; and
   an actuation means for overcoming said spring means to release said locking ring from engagement with said shoulder ring.

24. The tape drive and cartridge assembly according to claim 23 further comprising:
   at least one lever connected to said locking ring at one end thereof, and a fulcrum extending from said second wall and connected to a midpoint of said lever; and
   a pressable portion exposed on said second wall and connected to an opposite end of said lever wherein pressing of said pressable portion pivots said lever about said fulcrum to move said locking ring away from said shoulder ring.

25. The tape drive and cartridge assembly of claim 16 further comprising:
   a locking ring around the hub axle wherein the locking ring stabilizes the axle.

26. The tape drive and cartridge assembly of claim 16 further comprising:
   a sealing ring inside the housing of the cartridge between the axle and at least one of the walls of the housing.

27. A method for reducing shift in a tape, the method comprising the steps of:
   providing a cartridge having a housing defining an interior between a first wall and a second wall and further having a hub axle within the interior of the housing between the first wall and the second wall having a tape coiled around the hub axle;
   rotationally driving the hub axle by a tape drive that receives the cartridge; and
   maintaining the axle in a vertical position by providing a resiliently mounted locking ring through which the axle extends.

28. The method of claim 27 further comprising the step of:
   providing a resilient sealing ring between the tape housing and the locking ring.

29. The method of claim 27 further comprising the step of:
   providing a centering spindle associated with the tape drive for engaging the axle.

30. The method of claim 29 further comprising the step of:
   providing a centering element wherein the centering spindle extends through the centering element and further wherein the centering element contacts the locking ring.

31. The method of claim 27 further comprising the step of:
   providing tension between the tape drive and the axle.

32. The method of claim 27 further comprising the step of:
   providing tension between the locking ring and the axle.

* * * * *